United States Patent [19]

Tajima et al.

[11] Patent Number: 4,864,649
[45] Date of Patent: Sep. 5, 1989

[54] DRIVER CIRCUIT FOR DRIVING A LIGHT EMITTING ELEMENT BY SUPERIMPOSING AN ANALOG SUB-INFORMATION SIGNAL OVER A DIGITAL MAIN SIGNAL

[75] Inventors: Tsutomu Tajima; Toru Hamanaka, both of Tokyo, Japan

[73] Assignee: NEC Corporation, Tokyo, Japan

[21] Appl. No.: 89,461

[22] Filed: Aug. 26, 1987

[30] Foreign Application Priority Data

Aug. 26, 1986 [JP] Japan ................................ 61-199441

[51] Int. Cl.⁴ ............................................. H04B 9/00
[52] U.S. Cl. .................................. 455/608; 455/609; 455/611; 372/25; 372/33
[58] Field of Search ............................ 370/110, 4, 76; 455/600, 606, 607, 608, 609, 611, 613, 617, 618, 619; 332/7.51; 372/25, 33, 38, 31, 30, 26

[56] References Cited

U.S. PATENT DOCUMENTS

| | | | |
|---|---|---|---|
| 4,449,218 | 5/1984 | Strehl | 370/76 |
| 4,612,671 | 9/1986 | Giles | 455/609 |
| 4,625,105 | 11/1986 | Hentschel | 455/618 |
| 4,719,616 | 1/1988 | Akano | 370/110.4 |

FOREIGN PATENT DOCUMENTS 57-171854  10/1982  Japan ................................. 455/618

*Primary Examiner*—Robert L. Griffin
*Assistant Examiner*—Leslie Van Beek
*Attorney, Agent, or Firm*—Sughrue, Mion, Zinn, Macpeak & Seas

[57] ABSTRACT

A driver circuit for driving a light emitting element with a signal generated by superimposing an analog sub-information signal over the pulse string of a digital main signal. The driver circuit includes an input interception detector for detecting any interception of the digital main signal, and a gain-controlled amplifier for increasing the gain of the analog sub-information signal when the digital signal is intercepted.

9 Claims, 3 Drawing Sheets

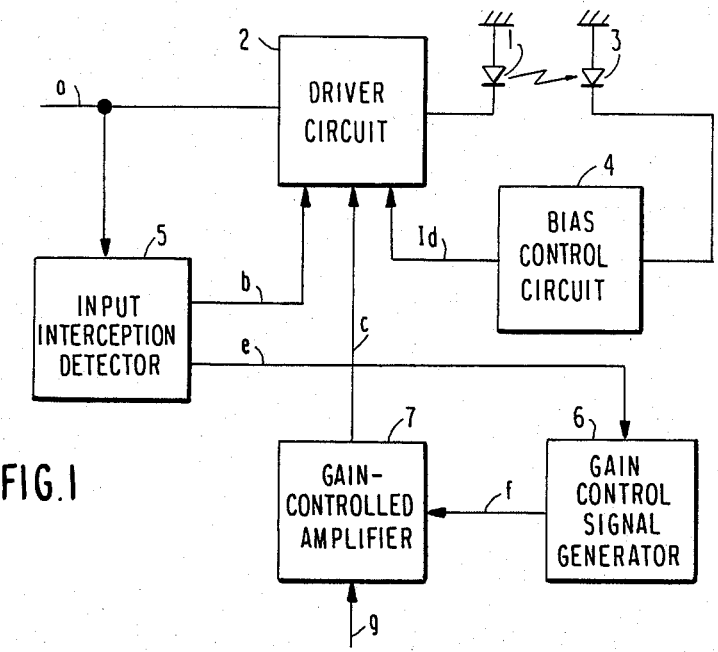
FIG. 1
FIG. 2
FIG. 3
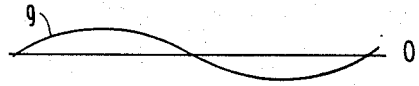
FIG. 4
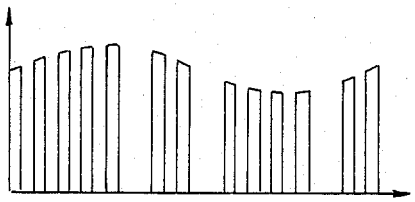
FIG. 5
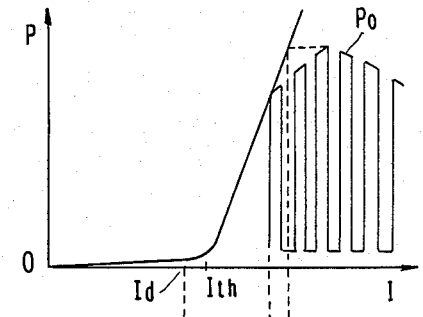

DRIVER CIRCUIT FOR DRIVING A LIGHT EMITTING ELEMENT BY SUPERIMPOSING AN ANALOG SUB-INFORMATION SIGNAL OVER A DIGITAL MAIN SIGNAL

BACKGROUND OF THE INVENTION

The present invention relates to a driver circuit for a light emitting element, and more particularly to a driver circuit for driving a light emitting element with a signal generated by superimposing, over the pulse string of a digital main signal, an analog sub-information signal whose frequency is lower than the bit rate of the main signal.

In a prior art optical modulating circuit of this kind, there is used a light emitting element driver circuit which involves two transistors having their emitters connected to each other (see the Japanese Laid-Open Patent Disclosure No. 57-171854). Out of the two transistors of this light emitting element driver circuit, to the collector of one (a first transistor) is connected the light emitting element, so that when the first transistor is ON, the other (a second transistor) is OFF, and vice versa The digital main signal is supplied to the base of either transistor, the first transistor for instance, and the first transistor is turned ON and OFF according to the high ("1") or low ("0") level, respectively, of the digital main signal to turn the light emitting element on and off. The lower frequency analog sub-information signal which is supplied to the common emitter terminal of the first and second transistors, controls the current flowing to the light emitting element according to the amplitude of the analog sub-information signal, and thereby modulates the optical intensity of the light emitting element.

However, if the supply of the digital main signal is prevented by circuit trouble or any other cause, the first transistor will remain turned OFF, and no more driving current will be supplied to the light emitting element. Thus the prior art optical modulating circuit has the disadvantage of being unable to transmit the analog sub-information signal and, consequently, to transmit monitoring information or the like contained in the analog sub-information signal when the digital main signal is intercepted.

Moreover, since the prior art optical modulating circuit has no feedback circuit to prevent the amplitude fluctuation of the analog sub-information signal supplied to the driver circuit, it has another disadvantage that the analog sub-information signal component of the optical signal is destabilized by the amplitude fluctuation of the analog sub-information signal.

SUMMARY OF THE INVENTION

An object of the present invention is to provide a light emitting element driver circuit which drives a light emitting element by superimposing an analog sub-information signal over a digital main signal, thereby permitting the analog sub-information signal to be transmitted as an optical signal even if the digital main signal is intercepted.

Another object of the invention is to provide a light emitting element driver circuit which, when the digital main signal is intercepted, the analog sub-information signal is transmitted with its signal-to-noise (S/N) ratio improved.

Still another object of the invention is to provide a light emitting element driver circuit intended to stabilize the analog sub-information signal component of the optical signal.

According to the invention, there is provided a light emitting element driver circuit comprising a light emitting element; driver means for driving the light emitting element by superimposing, over a digital main signal including a bit sequence of "1" and "0", an analog sub-information signal whose frequency is lower than the bit rate of the digital main signal; input interception detector means for detecting any interception of the inputting of the digital main signal; and gain-controlled amplifier means responsive to said input interception for making the amplitude of the analog sub-information signal greater than before the interception of the digital main signal inputting.

According to the more specific features of the invention, the light emitting element driver circuit further includes a light receiving element for receiving part of the output beam of the light emitting element and converting it into an electrical signal; detector means for detecting the amplitude component of the analog sub-information signal from the converted electrical signal; and means for generating a signal to control the gain of the gain-controlled amplifier means in accordance with the amplitude component detected by the detector means.

BRIEF DESCRIPTION OF THE DRAWINGS

The present invention will be better understood from the following detailed description taken in conjunction with the accompanying drawings in which:

FIG. 1 is a block diagram illustrating a first preferred embodiment of the invention;

FIG. 2 is a waveform diagram showing a digital main signal;

FIG. 3 is a waveform diagram showing an analog sub-information signal;

FIG. 4 is a waveform diagram showing a driving signal to be supplied to a laser diode for use in the light emitting element driver circuit illustrated in FIG. 1;

FIG. 5 is a diagram showing the injected current-versus-optical output characteristic and the operation of laser diode used in the light emitting element driver circuit illustrated in FIG. 1;

DETAILED DESCRIPTION OF THE PREFERRED EMBODIMENTS

Figure 6:
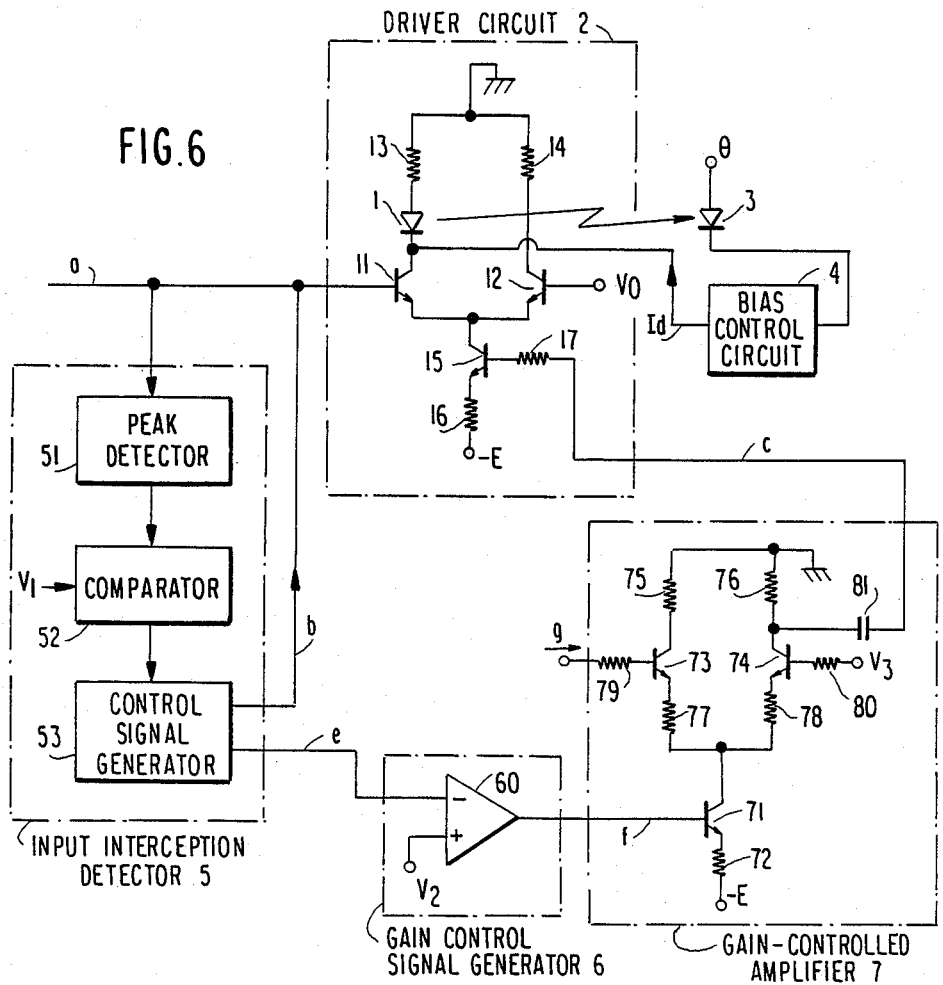
FIG. 6 is a circuit diagram including partial blocks illustrating details of the light emitting element driver circuit shown in FIG. 1.

Now, preferred embodiments of the present invention will be described in detail with reference to the accompanying drawings Referring to FIG. 1, a first preferred embodiment of the invention has a laser diode 1, a driver circuit 2 for driving the laser diode 1 with a signal generated by superimposing an analog sub-information signal c over a digital main signal a, a light receiving element 3 for monitoring the output beam of the laser diode 1, a bias control circuit 4 for supplying a prescribed bias current $I_d$ to the laser diode 1 in response to the monitored output beam, an input interception detector circuit 5 for detecting any interception of the digital main signal, a gain control signal generator circuit 6 for generating a signal f for controlling the gain of a gain-controlled amplifier 7 in accordance with the output e of the circuit 5, and the gain-controlled amplifier 7 for amplifying an analog sub-information signal g, whose gain is controlled in accordance with the signal f. Though a laser diode is used as the light emitting element in this particular embodiment, a light emitting diode (LED) may as well be used.

The digital main signal a is a high-speed signal consisting of a bit sequence of "1" and "0", a speech PCM signal of 140 M bits/s being used in this embodiment. The analog sub-information signal g is a sine wave monitoring signal of a lower frequency than the bit rate of the digital main signal a. The analog sub-information signal may either be a signal of a single frequency or one consisting of plural signals having different frequencies combined on a time axis.

In normal operation, the driver circuit 2 generates a driving signal, illustrated in FIG. 4, by amplitude-modulating the digital main signal a (FIG. 2) with the analog sub-information signal c (FIG. 3), and drives the laser diode 1 with it. The output beam of the laser diode 1 is partly detected by the monitoring light receiving element 3, and the bias control circuit 4 controls the bias current for the laser diode 1 in accordance with the detection output. Details of the bias control circuit 4 are described in the U.S. Pat. No. 4,009,385.

FIG. 5 is a diagram illustrating the characteristic of the relationship between the injected current I and the optical output P of the laser diode 1. In the figure, $I_d$ is a bias current supplied from the bias control circuit 4, and set at a level slightly lower than a threshold current $I_{th}$. The laser diode 1 while receiving the supply of the bias current $I_d$, generates an optical output signal $P_o$ in response to the driving signal supplied from the driver circuit 2. Meanwhile, as long as the digital main signal a is supplied, the input interception detector circuit 5 does not generate a signal b, and instead generates the signal e of a first level. In accordance with the level of the signal e, the gain control signal generator circuit 6 generates the gain control signal f, and the gain-controlled amplifier 7, setting a gain corresponding to the signal f, amplifies the analog sub-information signal g to output the signal c. In this case, in order to ensure a high S/N ratio for the digital main signal a, the amplitude of the signal c is set somewhat smaller than that of the digital main signal a.

When the digital main signal a is intercepted, the input interception detector circuit 5 supplies its output signal b to the driver circuit 2, and at the same time sets the level of the signal e at a second level higher than the first level. The level of the signal b is constant, close to that of "1" of the digital main signal. The gain control signal generator circuit 6, to which the signal e of the second level is supplied, so exercises control as to increase the gain of the gain-controlled amplifier 7. This gain is set greater than that of the normal operation. Thus, the S/N ratio of the analog sub-information signal component of the beam transmitted by the laser diode 1 is raised to further facilitate the detection of the analog sub-information signal at the receiving end.

FIG. 6 is a block diagram illustrating the details of main circuits shown in FIG. 1. Referring to FIG. 6, the driver circuit 2 has current-switching type transistors 11 and 12, to whose common emitters are connected to the collector of a transistor 15. The laser diode 1 is connected to the collector of the transistor 11, and receives the supply of the bias current $I_d$ from the bias control circuit 4. Reference numerals 13, 14, 16 and 17 represent resistors, while $V_o$ and E represent a reference voltage and a source voltage, respectively.

The digital main signal a is supplied to the base of the transistor 11. When its level is "1" (the earth level), the transistor 11 is ON (the transistor 12 is OFF), and when it is "0" (the negative source voltage level), the transistor 11 is OFF (the transistor 12 is ON). The analog sub-information signal c is supplied to the base of the transistor 15, whose collector current varies with the amplitude of the analog sub-information signal. Accordingly, the signal supplied to the laser diode 1, as shown in FIG. 4, is a signal resulting from the amplitude-modulation of the digital main signal with the analog sub-information signal.

The input interception detector circuit 5 has a peak detector 51 for detecting the peak level of the digital main signal a, a comparator 52 for comparing the peak level with a low-level reference voltage $V_1$, and a control signal generator 53 for generating the signals b and e. When the digital main signal a is supplied, the peak detector 51, every time the peak is detected, maintains that level. As long as the digital main signal a is supplied, its maintained level never falls below the reference voltage $V_1$ supplied to the comparator 52. In this case, the control signal generator 53 does not generate the signal b, and sets the signal e at a first level.

Meanwhile, if the supply of the digital main signal a is prevented by circuit trouble or the like, the peak detector 51 will become unable to maintain the peak level as prescribed, and the peak level will fall below the reference voltage $V_1$. Therefore, in response to the output of the comparator 52, the control signal generator 53 will generate the signal b of a high level close to the "1" level of the digital main signal a and, supplying it to the base of the transistor 11, set the signal e at a second level.

The gain control signal generator circuit 6, amplifies with an amplifier 60 the difference between the level of the signal e and a reference voltage $V_2$, and generates the signal f. The voltage of the signal f is higher when the signal e is at the second level than when it is at the first level.

The gain-controlled amplifier 7 has a transistor 71 whose collector current varies with the voltage of the signal f, a transistor 73 to whose base is supplied the analog sub-information signal g, a transistor 74 whose emitter is coupled to that of the transistor 73 via the resistors and whose base is supplied with a reference voltage $V_3$, resistors 72, 75, 76, 77, 78, 79 and 80, and an output-coupled condenser 81. The signal c, provided by amplifying the analog sub-information signal g, is supplied via the condenser 81 to the base of the transistor 15 of the driver circuit 2. The gain of the gain-controlled amplifier 7 varies with the collector current of the transistor 71. Now supposing that the signal e is at the first level, the collector current of the transistor 71 will have a relatively low amperage, and the gain will be set somewhat lower. However, if the signal e is at the second level, the collector current of the transistor 71 will become greater, and so will the gain. Therefore, if the digital main signal is intercepted, the gain of the gain-controlled amplifier 7 will increase, and the amplitude of the analog sub-information signal c, supplied to the driver circuit 2, will expand.

Figure 7:
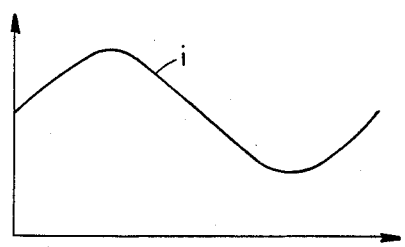
FIG. 7 is a waveform diagram showing the driving signal when the digital main signal is intercepted.

Meanwhile, when the digital main signal a is intercepted, since the level of the signal b is high then, the driving signal supplied by the driver circuit 2 to the laser diode 1 will become a signal i with a larger modulation amplitude, as shown in FIG. 7. The reasons for the high level of the signal b are to turn the transistor 11 ON and to permit a greater amplitude for the analog sub-information signal.

Figure 8:
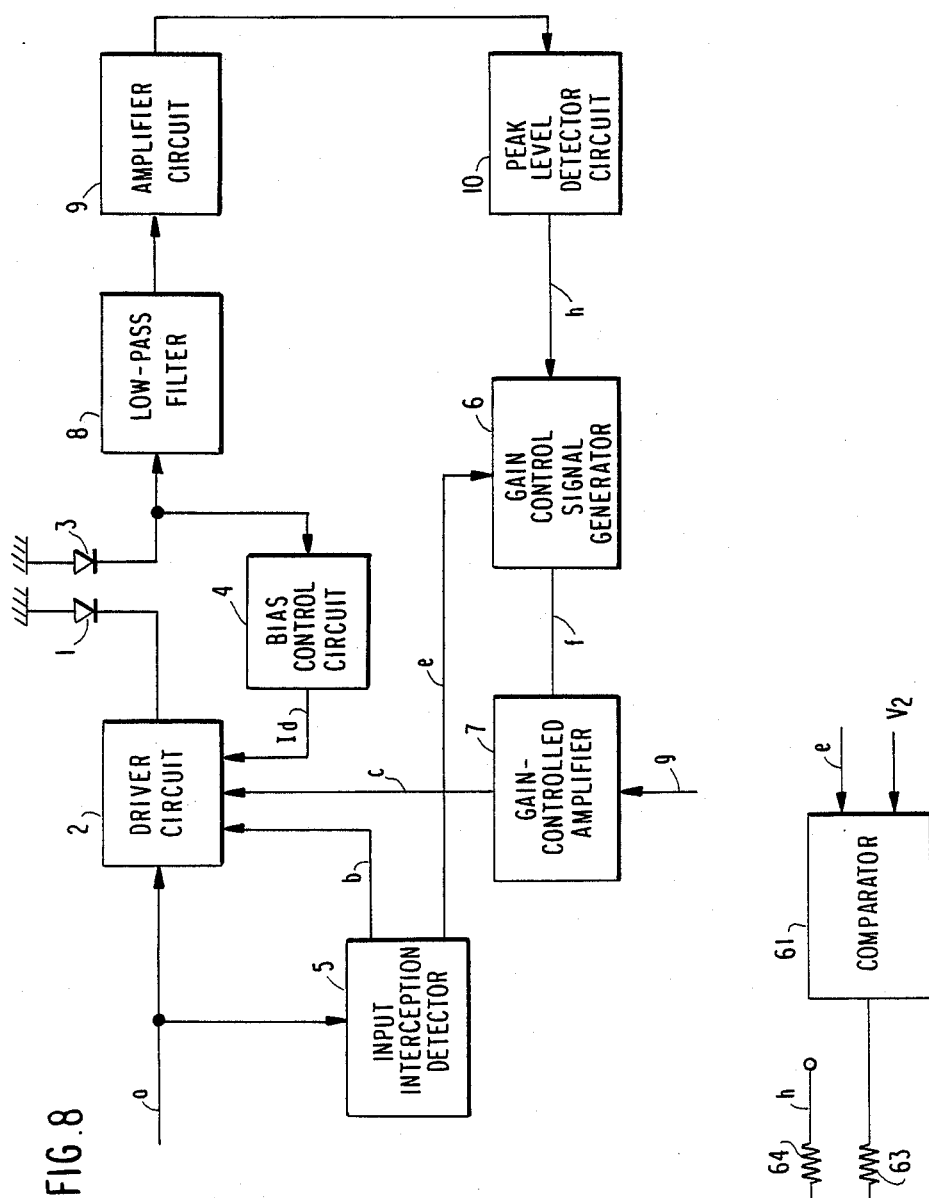
FIG. 8 is a block diagram illustrating a second preferred embodiment of the invention.

Referring now to FIG. 8, a second preferred embodiment of the present invention includes the circuits of the first embodiment, illustrated in FIG. 1, plus circuits for eliminating the amplitude fluctuation of the analog sub-information signal g.

Thus the second embodiment detects the amplitude of the analog sub-information signal with a feedback loop comprising a low-pass filter 8, an amplifier circuit 9 and a peak level detector circuit 10, and so controls the gain of a gain-controlled amplifier 7 as to keep the amplitude of a signal c before and after the interception of the digital main signal at respectively constant levels The output of a light receiving element 3, consisting of a photodiode for monitoring the optical output of a laser diode 1 is supplied to the low-pass filter 8, where the low-frequency analog sub-information signal is extracted. The extracted analog sub-information signal is amplified by the amplifier circuit 9 to a prescribed amplitude, and the peak amplitude of the analog sub-information signal is detected and outputted by the peak level detector circuit 10. A peak detected voltage h thereby detected is supplied to a gain control signal generator circuit 6, which compares it with the voltage of a signal e from an input interception detector circuit 5 to output a gain control signal f corresponding to the difference. This gain control signal f is outputted to the gain-controlled amplifier 7, to which an analog sub-information signal g is supplied, and the gain is so controlled as to reduce the difference between the voltage of the signal e and the peak detected voltage to keep constant all the time the amplitude of an outputted analog sub-information signal c. And this signal c is supplied to a light emitting element driver circuit 2 to be superimposed over the digital main signal a.

Figure 9:
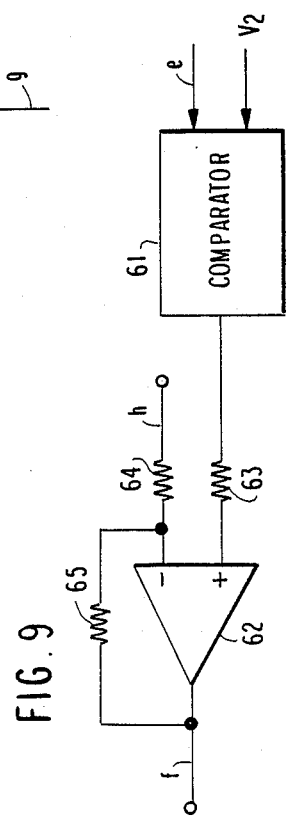
FIG. 9 is a block diagram of a gain control signal generator circuit for use in the light emitting element driver circuit illustrated in FIG. 8.

FIG. 9 is a block diagram illustrating the gain control signal generator circuit 6 for use in the embodiment shown in FIG. 8.

Referring to FIG. 9 a comparator 61 compares the signal e supplied from the input interception detector circuit 5 with the reference voltage $V_2$, and generates an output voltage corresponding to their difference. The output of the comparator 61 is supplied to a non-inverting input terminal of an operational amplifier 62 through a registor 63, while the output h of the peak level detector circuit 10 is fed to an inverting input terminal of same through a resistor 64, and the difference between the signals is amplified by an amplification ratio determined by the ratio between the resistances of resistors 64 and 65 to generate the gain control signal f.

As the amplitude of the analog sub-information signal g is increased, the voltage of the signal h rises. As, at this time, the operational amplifier 62 amplifies the input signal of the inverted level, the voltage of the gain control signal f drops, with the result that the gain of the gain-controlled amplifier 7 decreases and so does the amplitude of the analog sub-information signal.

Conversely, if the amplitude of the analog sub-information signal g decreases, the voltage of the gain control signal f will rise and so will the gain of the gain-controlled amplifier 7, resulting in an increased amplitude of the analog sub-information signal. Accordingly, control is so effected as to keep the amplitude of the analog sub-information signal constant.

As hitherto described, the present invention has the advantages of permitting the analog sub-information signal to be transmitted even when the input digital main signal is intercepted and of improving the S/N ratio of the analog sub-information signal by increasing its modulation amplitude. Since the amplitude of the analog sub-information signal is kept at respectively constant levels during normal operation and when the input is intercepted, its degree of modulation is stabilized.

What is claimed is:

1. A light emitting element driver circuit comprising:
   a light emitting element;
   driver means, responsive to a digital main signal including a bit sequence of "1" and "0", for driving said light emitting element by superimposing, over a digital main signal, an analog sub-information signal whose frequency is lower than the bit rate of said digital main signal;
   input interception detector means, electrically coupled to said driver means, for detecting any interception of the inputting of said digital mean signal and for producing a control signal for keeping said driver means active; and
   gain-controlled amplifier means, electrically coupled to said input interception detector means, responsive to said input interception for amplifying an input sub-information signal to produce said analog sub-information signal which is greater than before the interception of said digital main signal inputting, said gain-controlled amplifier means electrically coupled to said driver means and providing said analog sub-information signal to said driver means.

2. A light emitting element driver circuit, as claimed in claim 1, wherein said driver means comprises means for amplitude-modulating said digital main signal with said analog sub-information signal to produce a driving signal.

3. A light emitting element driver circuit, as claimed in claim 1, wherein said input interception detector means supplies said driver means with a signal of a level close to the "1" level, instead of said digital main signal, in response to detection of said input interception, and at the same time supplies said gain-controlled amplifier means with a control signal to increase the gain.

4. A light emitting element driver circuit as claimed in claim 1, further including:
   a light receiving element for receiving part of the output beam of said light emitting element and converting it into an electrical signal;
   detector means for detecting the amplitude component of said analog sub-information signal from said electrical signal; and
   means for generating a signal to control the gain of said gain-controlled amplifier means in accordance with the amplitude component detected by said detector means.

5. A light emitting element driver circuit, as claimed in claim 4, wherein said driver means further including means for amplitude-modulating said digital main signal with said analog sub-information signal to produce a driving signal.

6. A light emitting element driver circuit, as claimed in claim 4, wherein said input interception detector means supplies said driver means with a signal of a level close to the "1" level, instead of said digital main signal, in response to detection of said input interception, and at the same time supplies said gain-controlled amplifier means with a control signal to increase the gain.

7. A light emitting element driver circuit as claimed in claim 6, wherein said input interception detector circuit comprises:
   a peak detector for detecting the peak level of said digital main signal;
   a comparator connected to said peak detector for comparing the detected peak level of said digital main signal with a low level reference voltage; and
   a control signal generator connected to said comparator for generating said signal of a level close to the 1 level and said control signal.

8. A light emitting element driver circuit as claimed in claim 4, wherein said detector means comprise:
   a low-pass filter connected to the output of said light receiving element for extracting the low-frequency analog sub-information signal; and
   an amplifier circuit connected to said low-pass filter for amplifying the extracted low-frequency analog sub-information signal to a selected amplitude.

9. A light emitting element driver circuit as claimed in claim 4, further comprising:
   a bias control circuit, connected to said light receiving element and to said driver means, for controlling the bias current of said light emitting element in accordance with the output of said light receiving element.

* * * * *

UNITED STATES PATENT AND TRADEMARK OFFICE
CERTIFICATE OF CORRECTION

PATENT NO. : 4,864,649

DATED : September 5, 1989

INVENTOR(S) : Tsutomu TAJIMA et al

It is certified that error appears in the above-identified patent and that said Letters Patent is hereby corrected as shown below:

Column 5, line 52, delete "registor" and insert --resistor--.

Signed and Sealed this

Sixth Day of November, 1990

Attest:

HARRY F. MANBECK, JR.

*Attesting Officer*  *Commissioner of Patents and Trademarks*